Sept. 5, 1939.  H. L. MUELLER  2,172,254
RIM ASSEMBLY AND METHOD OF MAKING SAME
Filed Aug. 7, 1934  2 Sheets-Sheet 1
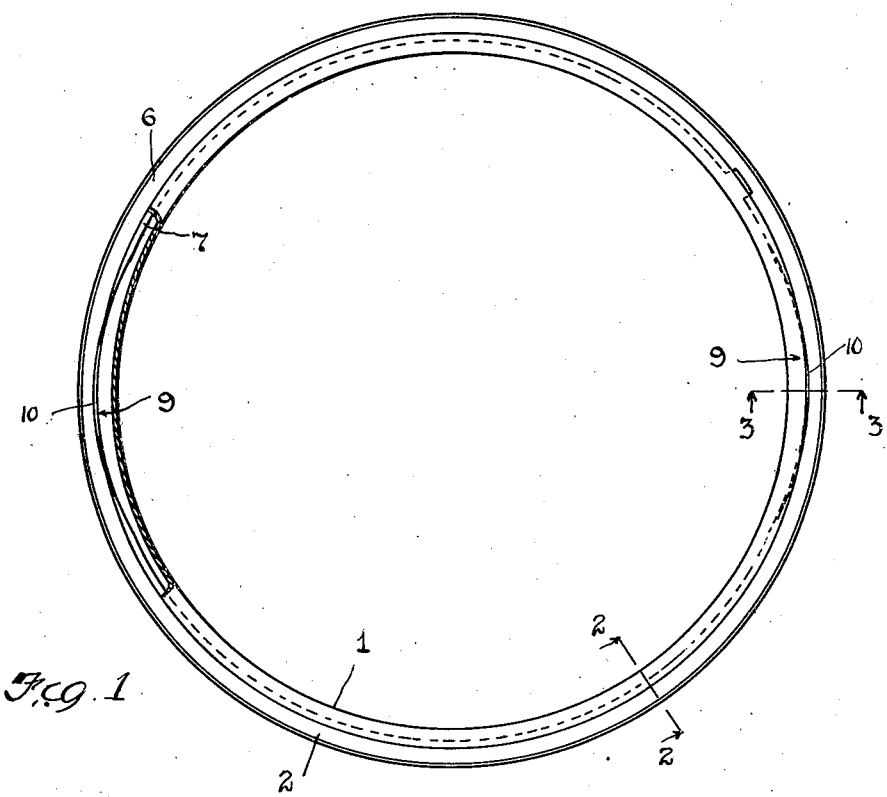
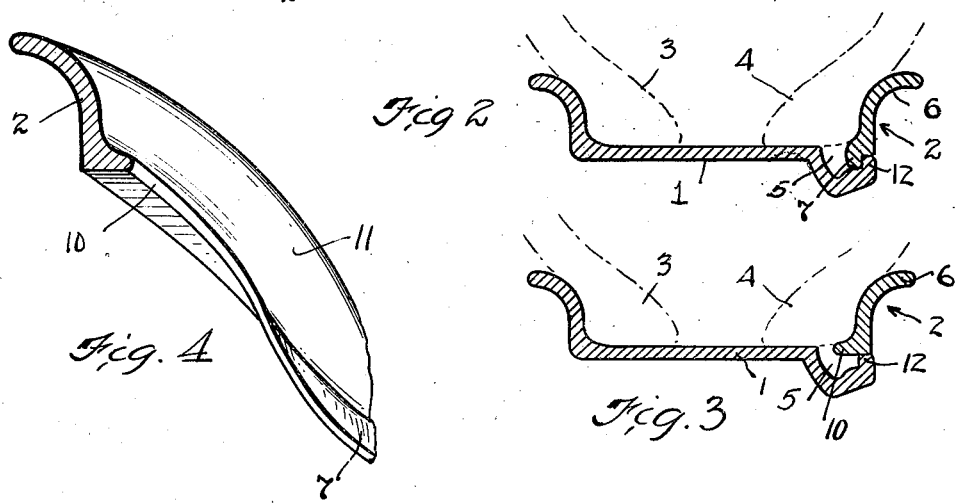
INVENTOR.
Homer L. Mueller
BY
Fay, Oberlin & Fay
ATTORNEYS.

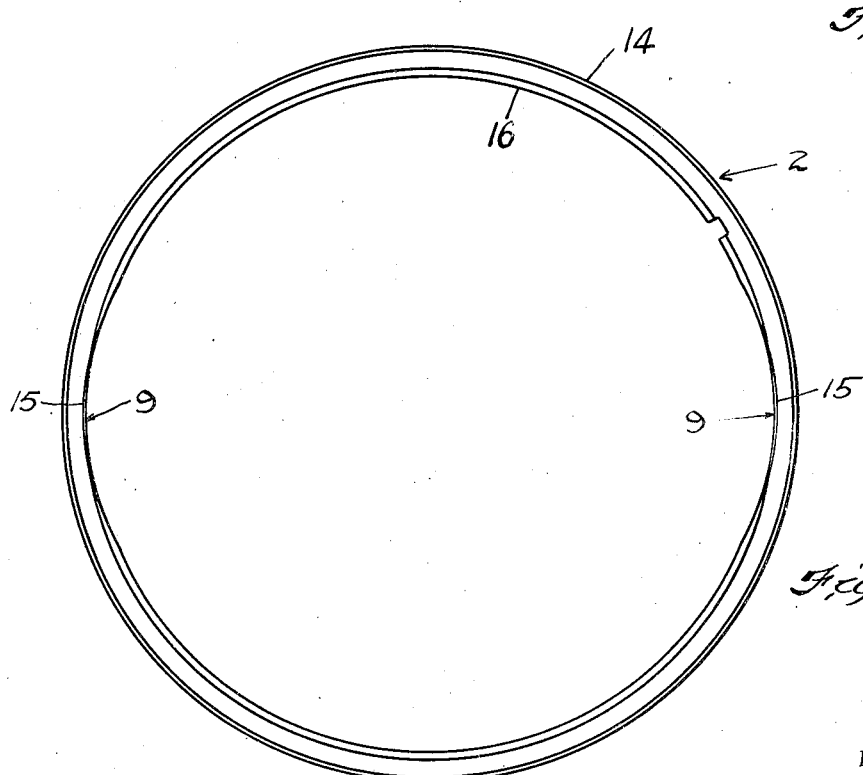

Patented Sept. 5, 1939

2,172,254

UNITED STATES PATENT OFFICE 2,172,254

RIM ASSEMBLY AND METHOD OF MAKING SAME

Homer L. Mueller, Cleveland, Ohio, assignor to The Cleveland Welding Company, Cleveland, Ohio, a corporation of Ohio Application August 7, 1934, Serial No. 738,776

1 Claim. (Cl. 152—411)

This invention relates as indicated to rim assemblies and methods of making the same and refers more particularly to rim assemblies such as are employed on automobiles and the like for the purpose of retaining and supporting pneumatic tires.

My invention relates more specifically to the construction of a rim assembly of the character described wherein one of the flanges whereby the pneumatic tire is laterally supported on the rim is in the form of an endless removable ring in order to facilitate the mounting and demounting of the tires on the rim.

With regard to the structure of the rim assembly, my invention pertains to the formation of a removable side ring characterized by the fact that it may be applied to and taken off from the main rim body by a minimum of effort; the structure of the ring being such, however, that the possibility of its becoming dislodged and blown off from the rim is reduced to a minimum.

With regard to the mode of manufacture, my invention pertains particularly to an improved mode for making the previously described removable endless side ring, so that such ring may have the required structural strength while made from relatively inexpensive material and by an economical and inexpensive process.

Other objects of my invention will appear as the description proceeds.

To the accomplishment of the foregoing and related ends, said invention, then, consists of the means hereinafter fully described and particularly pointed out in the claim; the annexed drawings and the following description setting forth in detail one method constituting, however, but one of various applications of the principle of my invention.

In said annexed drawings:

Fig. 1 is a side elevational view partially in section of a rim assembly constructed in accordance with the principles of my invention; Fig. 2 is a transverse sectional view drawn to an enlarged scale of the assembly illustrated in Fig. 1 taken on a plane substantially indicated by the line 2—2; Fig. 3 is a view similar to Fig. 2 but taken on a plane substantially indicated by the line 3—3 in Fig. 1; Fig. 4 is a perspective view of a portion of the side ring in the region particularly illustrated in Fig. 3; Fig. 5 is a side elevational view of an endless side ring formed by the mode comprising my invention; Fig. 6 is a perspective view of a flat blank employed in the formation of the side ring illustrated in Fig. 5 and Figs. 7, 8 and 9 are respectively sectional views showing the different stages in the formation of such ring.

Referring now more specifically to the drawings and more especially to Fig. 1, it will be noted that my invention pertains to a pneumatic tire supporting rim assembly comprising two principal sections, namely, a main rim body section generally indicated at 1 and a removable endless side ring generally indicated at 2. The beads of the pneumatic tire casing adapted to be supported by the rim assembly are indicated in broken lines at 3 and 4. The main rim body 1 is, along one side thereof, provided with a groove generally indicated at 5 into which one side of the ring 2 may be dropped during the removal, clearly illustrated for example in Gammeter U. S. Patent No. 895,360.

The endless side ring shown as a part of the assembly in the aforesaid Gammeter patent is rather difficult to remove for the reason that the points of the ring in areas spaced 90° from the area dropped into the groove tends to engage the flange or seat upon which the ring normally rests.

H. W. Kranz, in U. S. Patent No. 1,963,854, suggested the expedient of swaging down one of the seats respectively formed on the main rim and the side ring in order to eliminate most, if not all, of such interference. The present invention is an improvement on the disclosure in the last above identified patent, looking particularly to the formation of the side ring so that there is little, if any, possibility of its being dislodged from its seat, particularly in the areas where such seats are relieved, due to the high internal pressure in pneumatic tires which is sometime encountered.

In accordance with the principles of my invention the side ring generally indicated at 2 and comprising a tire-engaging portion 6 and a rim-engaging flange 7 is in local diametrically opposite areas, generally indicated at 9 in Fig. 1, so formed that the flange 7 normally extending radially inwardly now extends axially under the adjacent bead 4 of the pneumatic tire supported by the rim assembly.

As above indicated the axial extent of the flange 10 is such as to substantially underlie the bead 4 of the tire, so that the pressure normally tending to distort or displace the ring axially and unseat the same will be effectively counteracted by the radial pressure of the bead 4 against the flange 10.

The manner in which the flange 7 is inturned or bent into a substantially axially extending position is most clearly illustrated in Fig. 4. In this figure the face generally indicated at 11 of the side ring 2 is the face which engages the tire. As previously indicated, the flange 7 normally extends radially inwardly so as to engage a flange 12 on the side of the trough or groove 5 of the rim 1. In the areas 9, however, the flange 7 is rolled or similarly formed as at 10 into an axially extending position.

The formation of the flange 7 as at 10 in the areas 9 provide sufficient relief between the cooperating seats employed to secure the parts in assembled relation so that when the ring is dropped into the groove at the top as viewed in Fig. 1 and moved outwardly at the bottom, as in view 1, the sides of the ring may readily clear the flange 12 on the rim so that the ring may be taken off the rim with a minimum of springing. The rolling or forming of the flange 7 into the axially extending flange 10 has two distinct advantages: First, all of the metal of the ring structure is retained so that the strength of such ring is not impaired in any way; and secondly, the axial extension of the flange 10 so as to underlie the bead 4 also assists in securing the ring against being unseated.

The mode in which the side ring as previously described and as specifically illustrated in Fig. 5 is made is particularly illustrated in Figs. 6 to 9. Fig. 6 illustrates a flat bar or strip of stock generally designated by 13. The element 13 is preferably cut to such length that it may be circularized and welded into a complete annulus having a diameter equal to the diameter of the side ring 2.

The flat bar or strip 13 is as previously indicated circularized, welded and formed so that its cross-sectional form is substantially as indicated in Fig. 7, i. e., comprising two legs 14 and 15 respectively extending radially and axially. The radial flange 14 is then curved into the form illustrated in Fig. 8, preferably leaving the flange 15 in this operation extending axially. The areas of the flange 15 which lie between the relieved areas generally indicated at 9 are then rolled or suitably formed radially inwardly as illustrated at 16 in Fig. 9. This radial inward extension 16 is the equivalent of the flange 7 illustrated in Fig. 2, i. e., the means whereby the ring engages the rim body in order to prevent axial displacement between the parts when an inflated tire is supported by the rim assembly.

While in the foregoing description it has been stated that the radially extending flange 14 is formed into finished shape ahead of the formation of the axially extending flange 15, nevertheless, it is to be understood that the sequence of operations on these two parts may be reversed without departing from the principles of my invention.

The above described method of forming the side rings from flat stock is particularly advantageous from the standpoint of the cost of the finished ring. Heretofore it has been uniform practice to form side rings of the character described from special mill sections having a cross-sectional configuration substantially identical with the cross-sectional configuration of the finished side ring. Mill sections of such special character are of necessity considerably more expensive than the flat stock utilized in forming the side ring according to the mode comprising my invention.

Other forms may be employed embodying the features of my invention instead of the one herein explained, change being made as regards the means and the steps herein disclosed, provided the elements stated by the following claim or the equivalent of such stated elements be employed, whether produced by my preferred method or by others embodying steps equivalent to those stated in the following claim.

I, therefore, particularly point out and distinctly claim as my invention:

In a vehicle wheel rim assembly, the combination of a tire supporting rim body provided along one side with a groove and an annular radial ring retaining and ring seating flange, an endless removable side ring provided with an integral radially inwardly extending flange on its inner periphery laterally engaging said flange on said rim body, said integral ring flange having a portion that is bent axially parallel to the axis of the rim so as to clear said annular flange and to engage the bead of a tire mounted on said rim, said ring seating on the periphery of said annular flange throughout the circumference thereof.

HOMER L. MUELLER.